(12) United States Patent
Chen et al.

(10) Patent No.: US 7,701,846 B2
(45) Date of Patent: Apr. 20, 2010

(54) BAD DATA PACKET CAPTURE DEVICE

(75) Inventors: Dong Chen, Croton On Hudson, NY (US); Alan Gara, Mount Kisco, NY (US); Philip Heidelberger, Cortlandt Manor, NY (US); Pavlos Vranas, Danville, CA (US)

(73) Assignee: International Business Machines Corporation, Armonk, NY (US)

( * ) Notice: Subject to any disclaimer, the term of this patent is extended or adjusted under 35 U.S.C. 154(b) by 314 days.

(21) Appl. No.: 11/768,572

(22) Filed: Jun. 26, 2007

(65) Prior Publication Data

US 2009/0003228 A1    Jan. 1, 2009

(51) Int. Cl.
*H04L 1/00* (2006.01)

(52) U.S. Cl. .................. 370/216; 370/242; 370/248; 370/250; 370/252; 714/18

(58) Field of Classification Search ............... 714/18
See application file for complete search history.

(56) References Cited

U.S. PATENT DOCUMENTS 6,263,397 B1 *  7/2001  Wu et al. .................. 710/268

2005/0007986 A1 *  1/2005  Malladi et al. ............. 370/342
2006/0050737 A1 *  3/2006  Hsu ........................... 370/474
2007/0195774 A1 *  8/2007  Sherman et al. ............ 370/392

* cited by examiner

*Primary Examiner*—Chi H. Pham
*Assistant Examiner*—Shick Hom
(74) *Attorney, Agent, or Firm*—Scully, Scott, Murphy & Presser, P.C.; Daniel P. Morris, Esq.

(57) ABSTRACT

An apparatus and method for capturing data packets for analysis on a network computing system includes a sending node and a receiving node connected by a bi-directional communication link. The sending node sends a data transmission to the receiving node on the bi-directional communication link, and the receiving node receives the data transmission and verifies the data transmission to determine valid data and invalid data and verify retransmissions of invalid data as corresponding valid data. A memory device communicates with the receiving node for storing the invalid data and the corresponding valid data. A computing node communicates with the memory device and receives and performs an analysis of the invalid data and the corresponding valid data received from the memory device.

13 Claims, 2 Drawing Sheets

BAD DATA PACKET CAPTURE DEVICE

STATEMENT REGARDING FEDERALLY SPONSORED RESEARCH OF DEVELOPMENT

The U.S. Government has a paid-up license in this invention and the right in limited circumstances to require the patent owner to license others on reasonable terms as provided for by the terms of Contract. No. B554331 awarded by the Department of Energy.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. patent application Ser. No. 11/768,777, for "A SHARED PERFORMANCE MONITOR IN A MULTIPROCESSOR SYSTEM"; U.S. patent application Ser. No. 11/768,645, for "OPTIMIZED COLLECTIVES USING A DMA ON A PARALLEL COMPUTER"; U.S. patent application Ser. No. 11/768,781, or "DMA SHARED BYTE COUNTERS IN A PARALLEL COMPUTER"; U.S. patent application Ser. No. 11/768,784, for "MULTIPLE NODE REMOTE MESSAGING"; U.S. patent application Ser. No. 11/768,697, for "A METHOD AND APPARATUS OF PREFETCHING STREAMS OF VARYING PREFETCH DEPTH"; U.S. patent application Ser. No. 11/768,532, for "PROGRAMMABLE PARTITIONING FOR HIGH-PERFORMANCE COHERENCE DOMAINS IN A MULTIPROCESSOR SYSTEM"; U.S. patent application Ser. No. 11/768,857, for "METHOD AND APPARATUS FOR SINGLE-STEPPING COHERENCE EVENTS IN A MULTIPROCESSOR SYSTEM UNDER SOFTWARE CONTROL"; U.S. patent application Ser. No. 11/768,547, for "INSERTION OF COHERENCE EVENTS INTO A MULTIPROCESSOR COHERENCE PROTOCOL"; U.S. patent application Ser. No. 11/768,791, for "METHOD AND APPARATUS TO DEBUG AN INTEGRATED CIRCUIT CHIP VIA SYNCHRONOUS CLOCK STOP AND SCAN"; U.S. patent application Ser. No. 11/768,795, for "DMA ENGINE FOR REPEATING COMMUNICATION PATTERNS"; U.S. patent application Ser. No. 11/768,799, for "METHOD AND APPARATUS FOR A CHOOSE-TWO MULTI-QUEUE ARBITER"; U.S. patent application Ser. No. 11/768,800, for "METHOD AND APPARATUS FOR EFFICIENTLY TRACKING QUEUE ENTRIES RELATIVE TO A TIMESTAMP"; U.S. patent application Ser. No. 11/768,593, or "EXTENDED WRITE COMBINING USING A WRITE CONTINUATION HINT FLAG"; U.S. patent application Ser. No. 11/768,805, for "A SYSTEM AND METHOD FOR PROGRAMMABLE BANK SELECTION FOR BANKED MEMORY SUBSYSTEMS"; U.S. patent application Ser. No. 11/768,905, for "AN ULTRASCALABLE PETAFLOP PARALLEL SUPERCOMPUTER"; U.S. patent application Ser. No. 11/768,810, for "SDRAM DDR DATA EYE MONITOR METHOD AND APPARATUS"; U.S. patent application Ser. No. 11/768,812, for "A CONFIGURABLE MEMORY SYSTEM AND METHOD FOR PROVIDING ATOMIC COUNTING OPERATIONS IN A MEMORY DEVICE"; U.S. patent application Ser. No. 11/768,559, for "ERROR CORRECTING CODE WITH CHIP KILL CAPABILITY AND POWER SAVING ENHANCEMENT"; U.S. patent application Ser. No. 11/768,552, for "STATIC POWER REDUCTION FOR MIDPOINT-TERMINATED BUSSES"; U.S. patent application Ser. No. 11/768,527, for "COMBINED GROUP ECC PROTECTION AND SUBGROUP PARITY PROTECTION"; U.S. patent application Ser. No. 11/768,669, for "A MECHANISM TO SUPPORT GENERIC COLLECTIVE COMMUNICATION ACROSS A VARIETY OF PROGRAMMING MODELS"; U.S. patent application Ser. No. 11/768,813, for "MESSAGE PASSING WITH A LIMITED NUMBER OF DMA BYTE COUNTERS"; U.S. patent application Ser. No. 11/768,619, for "ASYNCRONOUS BROADCAST FOR ORDERED DELIVERY BETWEEN COMPUTE NODES IN A PARALLEL COMPUTING SYSTEM WHERE PACKET HEADER SPACE IS LIMITED"; U.S. patent application Ser. No. 11/768,682, for "HARDWARE PACKET PACING USING A DMA IN A PARALLEL COMPUTER"; and U.S. patent application Ser. No. 11/768,752, for "POWER THROTTLING OF COLLECTIONS OF COMPUTING ELEMENTS".

FIELD OF THE INVENTION

The present invention relates to processing data packets on a network system and, more specifically, capturing data packets transmitted on high speed communications links for error detection and signal integrity analysis.

BACKGROUND OF THE INVENTION

High-speed digital data links are commonly used in communication networks and parallel computers. They typically consist of input/output (I/O) drivers (senders) at one end and I/O receivers at the other end, with copper or optical interconnections in between. The quality of the links are measured by the data eye size (the size of the valid data sampling window) on the receivers. There are typically a set of physical parameters, for example, the driver strength, pre-emphasis amplitude on the sender node, and termination resistor value, on the receiver node that can be optimized to achieve an optimal data eye size for a given link at a designed operating frequency. However, the data eye size parameter is a statistical average which is collected over a long period of time (relative to a data bit time on the link), and does not contain any transient properties of the link. For example, if a link error occurs, the eye size parameter does not ascertain if this is caused by a single bit error that could be the result of random link noise, or a burst of several bits that could indicate a more serious link problem.

Therefore, a need exists to capture a bad or invalid data packet for future analysis. A further need exists to capture a corresponding good or valid packet for future analysis in conjunction with the bad packet.

SUMMARY OF THE INVENTION

In an aspect of the invention, an apparatus for capturing data packets for analysis on a network computing system includes a sending node and a receiving node connected by a bi-directional communication link where the sending node sends a data transmission to the receiving node on the bi-directional communication link. The receiving node receives the data transmission and verifies the data transmission to determine valid data and invalid data and verifies retransmission of the data verified as invalid data as corresponding valid data. A memory device is in the receiving node for storing the invalid data and the corresponding valid data. A computing node communicates with the memory device and receives and performs an analysis of the invalid data and the corresponding valid data received from the memory device.

In a related aspect, the sending and receiving nodes communicate using a hardware protocol.

In a related aspect, the data transmission includes data packets.

In a related aspect, the packet includes cyclic redundancy check (CRC) verification data.

In a related aspect, the receiving node includes a decoder.

In a related aspect, the data transmission includes data packets and the receiving node is a decoder which rebuffers and arbitrates the data packets.

In a related aspect, the bi-directional communication link is high speed.

In a related aspect, the apparatus further includes a multiplexer selecting the bi-directional communication link from a plurality of data links.

In a related aspect, the state machine initiates an interrupt command to the computing node before the valid retransmitted data and the invalid data is sent to the to the computing node from the memory device.

In a related aspect, the computing node includes a processor.

In a related aspect, the apparatus includes a state machine communicating with the receiving node for implementing storage to the memory device of the invalid data and corresponding valid data.

In a related aspect, the memory device communicates with the state machine for receiving the invalid data and the corresponding valid data. The memory device receives the corresponding valid data after the sending node retransmits the data and the receiving node performs the receiving node data verification.

In a related aspect, the sending node provides data verification information and transmits the data verification information with the data transmission on the bi-directional communication link.

In a related aspect, the receiving node verifies the data transmission to determine valid data and invalid data by performing a receiving node data verification and comparing it with the sending node data verification information. The receiving node sends an acknowledgement to the sending node when the receiving node data verification and the sending node data verification information match indicating valid data. The receiving node does not send an acknowledgement to the sending node when the receiving node data verification and the sending node data verification information mismatch indicating invalid data, and the receiving node waits for a retransmission of the data transmission which included invalid data until the receiving node receives the corresponding valid data.

In another aspect of the invention, an apparatus for capturing data packets for analysis on a network computing system includes a bi-directional communication link connecting at least two nodes including a sending node and a receiving node, each of which sending and receiving nodes communicate uses a hardware protocol. The sending node providing data verification information and transmitting the data verification information with a data transmission on the bi-directional communication link. A receiving node receives the data transmission on the bi-directional communication link. The receiving node performs a receiving node data verification and compares it with the sending node data verification information. The receiving node sends an acknowledgement to the sending node when the receiving node data verification and the sending node data verification information match indicating valid data. The receiving node does not send an acknowl-edgement to the sending node when the receiving node data verification and the sending node data verification information mismatch indicating invalid data, and the receiving node waits for a retransmission of the data transmission which included invalid data until the receiving node receives corresponding valid data. A state machine communicates with the receiving node for implementing storage of the invalid data and the valid retransmitted data. A memory device communicates with the state machine for receiving the invalid data and the valid retransmitted data. The memory device receives valid retransmitted data after the sending node retransmits the data and the receiving node performs the receiving node data verification resulting in valid retransmitted data. A computing node communicates with the memory device and receives and performs an analysis of the valid retransmitted data and the invalid data received from the memory device.

In another aspect of the invention, a method of processing for capturing data packets for analysis on a network computing system comprises sending a data transmission from a sending node to a receiving node connected by a bi-directional communication link; receiving the data transmission on the receiving node; verifying the data transmission to determine valid data and invalid data; verifying retransmissions of data found to be invalid data as corresponding valid data; storing the invalid data and the corresponding valid data; and receiving and performing an analysis of the invalid data and the corresponding valid data.

In a related aspect, the method further includes sending an acknowledgement to the sending node from the receiving node when the receiving node data verification and a sending node data verification information match indicating valid data, and the receiving node does not send an acknowledgement to the sending node when the receiving node data verification and the sending node data verification information mismatch indicating invalid data; and waiting for a retransmission of the data transmission which included invalid data until the receiving node receives the corresponding valid data.

BRIEF DESCRIPTION OF THE DRAWINGS

These and other objects, features and advantages of the present invention will become apparent from the following detailed description of illustrative embodiments thereof, which is to be read in connection with the accompanying drawings, in which.

DETAILED DESCRIPTION OF THE INVENTION

Figure 1:
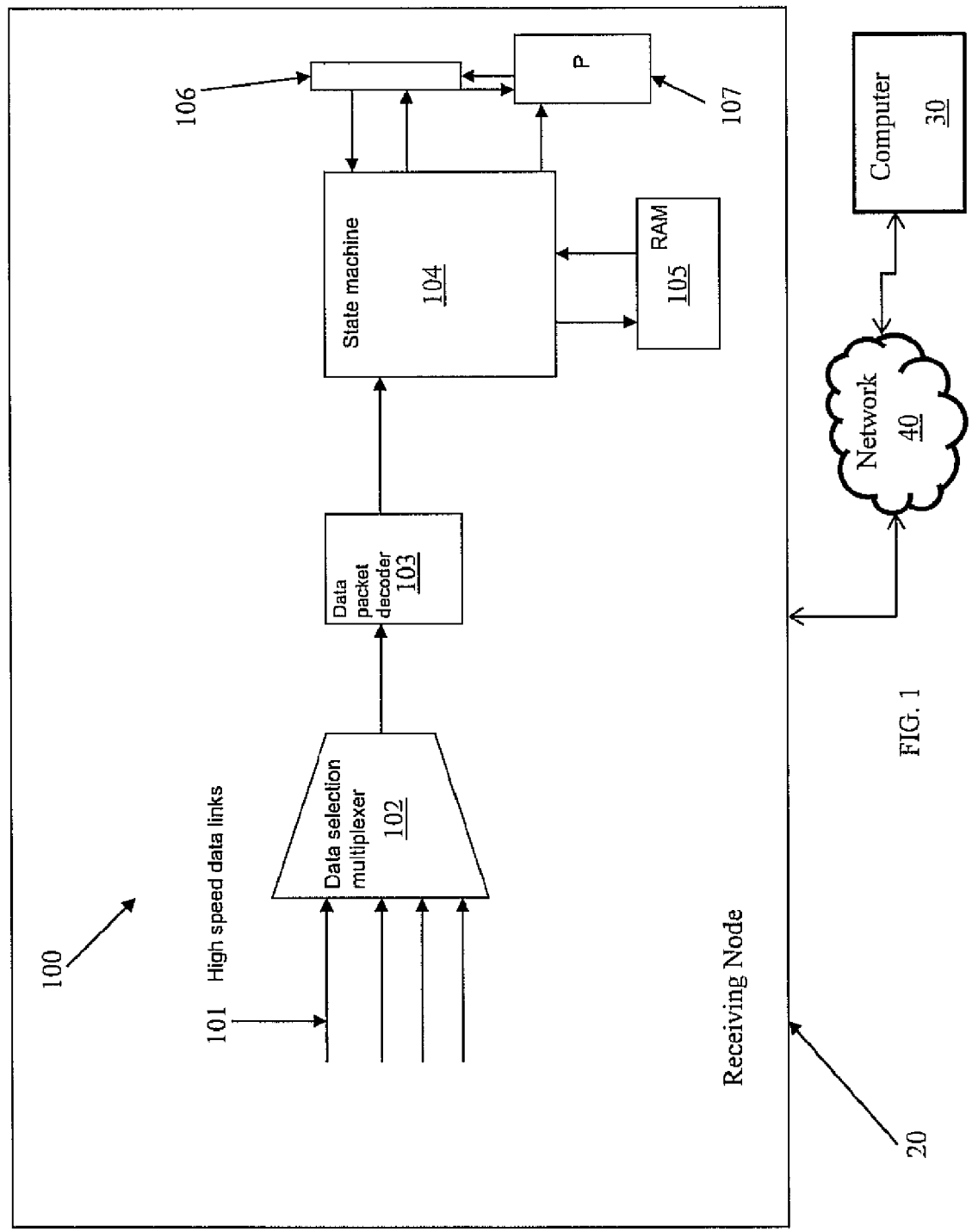
FIG. 1 is a block diagram depicting an illustrative embodiment of a data packet capturing device for capturing invalid (bad) data packets and retransmitted valid (good) data packets.
Figure 2:
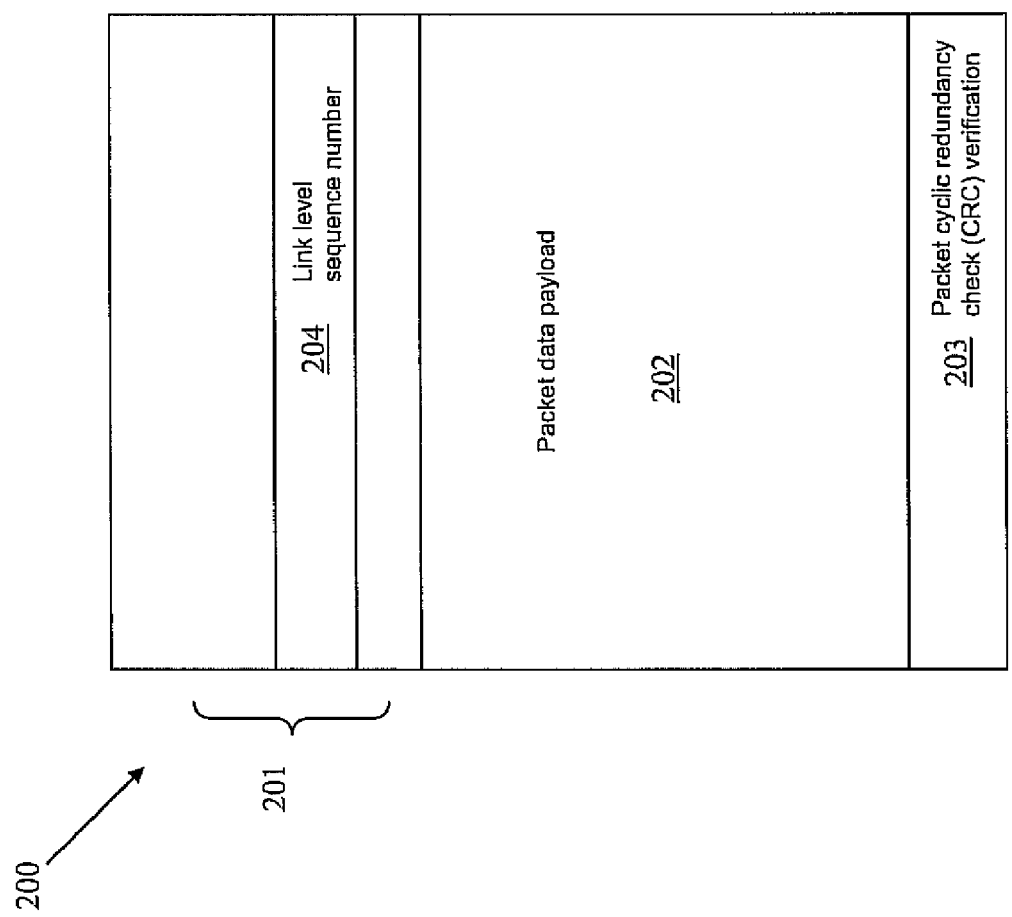
FIG. 2 is a block diagram of a representative data packet structure for capturing using the device shown in FIG. 1.

An illustrative embodiment of a data packet capturing apparatus 100 or device according to the present invention is shown in FIG. 1 and includes a bi-directional communication link embodied as a plurality of bi-directional high speed links 101. The links 101 connect a network computing system including a sender/receiver apparatus on one node, which in the current embodiment of the present invention, is a sending node, to a receiver/sender apparatus on another node, which in the current embodiment of the present invention, is a receiving node 20. The sending node, is envisioned to be substantially similar to the receiving node 20 shown in FIG. 1. A node is defined herein as a point in a communication topology where data packets being carried through the high speed links are rebuffered and arbitrated for the next stage. A node may include, for example, a processor, a computer system, a server, or a router. For example, the node 20 communicates with a computer 30, embodied as a sending node, via a network 40. The nodes communicate using a link hardware protocol. The link hardware protocol includes instructions for a retransmission of corrupted packets. An example of a data packet 200 format for transmitting data is shown in FIG. 2. The packet 200 includes a packet header 201, a packet data payload 202 and a packet cyclic redundancy check (CRC) verification 203. The packet 200 further includes a link level sequence number 204 in the packet header 201. The sending node implements the CRC verification by computing the packet CRC and appends the CRC as the trailer of the transmitted data packet. Each packet includes the link level sequence number 204 incremented in every subsequent packet transmitted over the link 101.

For example, when node "A" sends a packet to node "B", each packet transmitted over the link will get a link level sequence number in its packet header. The sequence number increments with the number of packet sent. For example, packet 1 has sequence number of 1, packet 2 has sequence number 2. The reverse link from node "B" to node "A" has its own but independent sequence number. For every packet node "A" transmitted to "B", A keeps a copy in its retransmission buffer until it gets an acknowledgement from "B". When node "B" receives a packet, it sends an acknowledgement packet with the packet sequence number back to node "A". For example, if node "B" receives packet 1, it could send node "A" an acknowledgement with sequence number 1. When node A receives this sequence number, it knows that packet 1 has been successfully transmitted and can be deleted from its retransmission buffer. The sequence number to acknowledge can also be grouped together, e.g., if node "B" receives packet 3,4,5, and previously only acknowledged packet number 2, it can acknowledge packet 5, then "A" knows that packet 3,4,5 are received correctly and it deletes these packets in its retransmission buffer. When a link error occurs, "B" would receive a packet, but the packet trailer CRC would not match the CRC calculated from the corrupted packet, then "B" will hold off sending acknowledge back, until "A" retransmits the same packet with a same sequence number. "A" has a timeout register that is programmable and typically covers the round trip time for the signal to propagate along the link wires in addition to some packet processing time.

The receiving node 20 implements a data verification by computing a new packet CRC and comparing it with the received packet CRC 203, which was computed by the sending node. If the results match, then the packet is valid or good, and the receiving node sends an acknowledgment containing the sequence number of the good packet back to the sending node. Alternatively, if the CRC comparison is a mismatch (does not match) then the packet is invalid or bad, then the receiving node will not send an acknowledgement, and will stop all further acknowledgments from being sent back to the sending node. The sending node includes a hardware timeout mechanism where it expects acknowledgements to be received within a predetermined time from the packets sent. If a packet with a certain sequence number is transmitted, but acknowledgment is not received in the specified time, the packet and all packets following this sequence number will be retransmitted over the same link.

The data packet capture device of the present invention relies on the link level retransmission hardware protocols to capture both the invalid (or corrupted) data packets and the valid (or uncorrupted) data packets with the same sequence number. Referring to FIG. 1, a data selection multiplexer 102 selects one receiving link of a number of high speed data links 101. Thus, a single packet capture apparatus 100 can be attached to and communicate with multiple incoming links to save silicon area on a silicon chip. The output of the multiplexer 102 is fed into a data packet decoder 103, which finds and marks the beginning and the end of a data packet along with the original data while sending the data packet to a state machine 104. The state machine 104 initiates writing the incoming data into memory embodied as static random access memory (SRAM) storage 105. The state machine 104 further provides access to a host embodied as a processor 107 or central processing unit (CPU) using a control bus 106.

In operation, the data packet decoder 103 performs the function of decoding data packets sent on the links 101. When the decoder 103 detects a valid data packet header, it raises a signal to the state machine 104 (or logic unit) indicating the beginning of a data packet. The decoder 103 lowers the same signal when the end of the packet is detected. The decoder 103 also checks the packet CRC. More often than not, the CRC check will be valid and, therefore, the decoder 103 remains idle until the next data packet is received. However, if the data packet CRC is invalid, then the decoder 103 raises another signal, which is a temporary signal to the state machine 104, indicating that the current packet is invalid. When an invalid packet is detected, the decoder 103 waits for the retransmission of the same packet (i.e., the same packet sequence number) from the sending node before it marks the packet again. All intermediate packets between the invalid packet and the retransmission of the packet with the same sequence number are discarded (not marked), thus the state machine 104 does not process them. The state machine 104, in the illustrative embodiment of the invention, is the main state machine for the packet capture apparatus. The state machine 104 receives data along with the packet marker and invalid packet indicator signals from the decoder 103, as well as, control bus access signals from the control bus 106. The state machine 104 also controls the access to the SRAM storage 105, which includes enough buffer space, for example, for two of the largest network packets. The SRAM 105 storage is divided, for example, into two slots, slot 1 for the invalid packet and slot two for the retransmitted valid packet.

Further, in operation, the state machine 104 remains in an idle state after a reset. If the control bus initiates a request to the SRAM storage 105, then the state machine 104 gives access to the control bus device 106. After the control bus device 106 is done, the state machine 105 returns to the idle state. The state machine remains in the idle state to watch for data and control signals from the packet decoder 103. When a packet beginning mark is detected (a packet flag signal is high), the state machine 104 starts to write into slot 1 of the SRAM 105 sequentially. Starting at address 0 of slot 1, and incrementing the address along the way. If the packet is valid, i.e., the invalid packet flag is not raised by the packet decoder 103, then the state machine goes back to the idle state after the current data packet and resets the next SRAM write address back to 0 of slot 1. The valid packet written in SRAM slot 1 will be overwritten when the next network packet is received. If the packet is invalid, after the current valid packet, the SRAM address is incremented to address 0 of SRAM slot 2, so that the invalid packet is kept in SRAM slot 1. When the packet flag is raised again by the decoder 103, it is the retransmission of the invalid packet which is now written in slot 2. If this retransmitted packet is good or valid, then it is captured in SRAM slot 2. If this packet is also invalid, i.e., corrupted in retransmission (and an invalid packet flag raised again), then the state machine 104 resets the SRAM address to 0 in slot 2, and waits for another retransmission until a valid packet is captured in slot 2. Once the retransmitted packet is valid, both an invalid and a valid packet are captured, and the state machine 104 raises a maskable interrupt flag to the processor 107, and waits for control bus 106 access. After the host or the on board CPU 107 reads both the invalid and valid packet using appropriate software, the state machine 104 can be reset from the control bus 106 to return to the idle state to capture the next invalid or bad packet. The host or CPU can use the analysis of errors to optimize link properties. For example, if multi-bit burst errors on a particular link, then parameters, such as, input/output driver driving strength, pre-emphasis amplitude, and terminator resistor value may be adjusted, and the link error pattern compared until an optimal parameter set is achieved.

Additionally, the data packet capture apparatus 100 may be used when initiating or bringing up a large parallel machine such as a rack of BLUE GENE®/P supercomputer with 1024 compute nodes, where each compute node has 4 processors and a 3-D torus network with 6 links embedded on the same compute ASIC chip. In such a system, the high speed network link drivers 101 (sending nodes) and receiving nodes are initially set to default parameters (driver strength, pre-emphasis amplitude, receiver impedance, etc). These settings usually work well for the majority of the links, however, a small number of links may have different characteristics, for example, some links have longer board traces than others in a compute rack. Thus, the default parameters may not be optimal for these links. To find the optimal parameters, a series of tests using the network links are run. The existing link level error counters for all links are monitored. When a link error happens on a particular link, the data packet capture apparatus 100 is then programmed to monitor that particular link 101, to capture a future bad or invalid packet and a corresponding good or valid packet. After an invalid data packet along with a valid data packet is captured, the data is analyzed by the host or CPU 107 for error patterns. This knowledge is then used to adjust a link driver, and receiving node parameters for the specific link to reduce the error rate on that link.

While the present invention has been particularly shown and described with respect to preferred embodiments thereof it will be understood by those skilled in the art that changes in forms and details may be made without departing from the spirit and scope of the present application. It is therefore intended that the present invention not be limited to the exact forms and details described and illustrated herein, but falls within the scope of the appended claims.

What is claimed is:

1. An apparatus for capturing data packets for analysis of data on a network computing system, comprising:
    a sending node and a receiving node connected by a bi-directional communication link where the sending node sends a data packet transmission to the receiving node on the bi-directional communication link, and the receiving node receives the data packet transmission and verifies the data packet transmission to determine valid data and invalid data, and the receiving node verifies retransmission of the invalid data as corresponding valid data in the retransmission;
    a memory device in the receiving node for storing the invalid data and the corresponding valid data; and
    a computing node communicating with the memory device and receiving and performing an analysis of the invalid data and the corresponding valid data received from the memory device;
    wherein the sending node provides data verification information and transmits the data verification information with the data transmission on the bi-directional communication link; and
    wherein the receiving node verifies the data transmission to determine valid data and invalid data by performing a receiving node data verification and comparing it with a sending node data verification information, the receiving node sending an acknowledgement to the sending node when the receiving node data verification and the sending node data verification information match indicating valid data, and the receiving node not sending the acknowledgement to the sending node when the receiving node data verification and the sending node data verification information mismatch indicating invalid data, and the receiving node waits for a retransmission of the data transmission which included invalid data until the receiving node receives the corresponding valid data.

2. The apparatus of claim 1, wherein each of the sending and receiving nodes communicate using a hardware protocol.

3. The apparatus of claim 1, wherein the data packets includes cyclic redundancy check (CRC) verification data.

4. The apparatus of claim 1, wherein the receiving node includes a decoder.

5. The apparatus of claim 1, wherein the data transmission includes data packets and the receiving node is a decoder which rebuffers and arbitrates the data packets.

6. The apparatus of claim 1, wherein the bi-directional communication link is high speed.

7. The apparatus of claim 1, further including a multiplexer selecting the bi-directional communication link from a plurality of data links.

8. The apparatus of claim 1, wherein a state machine initiates an interrupt command to the computing node before the valid retransmitted data and the invalid data is sent to the computing node from the memory device.

9. The apparatus of claim 1, wherein the computing node includes a processor.

10. The apparatus of claim 1, wherein the apparatus includes a state machine communicating with the receiving node for implementing storage to the memory device of the invalid data and corresponding valid data.

11. The apparatus of claim 10, wherein the memory device communicates with the state machine for receiving the invalid data and the corresponding valid data, the memory device receiving the corresponding valid data after the sending node retransmits the data and the receiving node performs the receiving node data verification.

12. An apparatus for capturing data packets for analysis of data on a network computing system, comprising:
    a bi-directional communication link connecting at least two nodes including a sending node and a receiving node, each of which sending and receiving nodes communicate using a hardware protocol;
    the sending node providing data verification information and transmitting the data verification information with a data transmission on the bi-directional communication link;
    the receiving node for receiving the data transmission on the bi-directional communication link, the receiving node performing a receiving node data verification and comparing the receiving node data verification with a sending node data verification information, the receiving node sending an acknowledgement to the sending node when the receiving node data verification and the sending node data verification information match indicating valid data, and the receiving node does not send the acknowledgement to the sending node when the receiving node data verification and the sending node data verification information mismatch indicating invalid data, and the receiving node waits for a retransmission of the data transmission which included invalid data until the receiving node receives corresponding valid data;

a state machine communicating with the receiving node for implementing storage of the invalid data and the valid retransmitted data;

a memory device communicating with the state machine for receiving the invalid data and the valid retransmitted data, the memory device receiving valid retransmitted data after the sending node retransmits the data and the receiving node performs the receiving node data verification resulting in valid retransmitted data; and a computing node communicating with the memory device and receiving and performing an analysis of the valid retransmitted data and the invalid data received from the memory device.

13. A method of processing for capturing data packets for analysis of data on a network computing system, comprising:

sending a data packet transmission from a sending node to a receiving node connected by a bi-directional communication link;

receiving the data packet transmission on the receiving node;

verifying the data packet transmission to determine valid data and invalid data;

verifying retransmissions of data found to be invalid data as corresponding valid data;

storing the invalid data and the corresponding valid data;

receiving and performing an analysis of the invalid data and the corresponding valid data;

sending an acknowledgement to the sending node from the receiving node when the receiving node data verification and a sending node data verification information match indicating valid data, and the receiving node not sending the acknowledgement to the sending node when the receiving node data verification and the sending node data verification information mismatch indicating invalid data; and waiting for a retransmission of the data transmission which included invalid data until the receiving node receives the corresponding valid data.

* * * * *